US007236996B2

(12) United States Patent
Ong

(10) Patent No.: US 7,236,996 B2
(45) Date of Patent: Jun. 26, 2007

(54) METHODS FOR GENERATING RANDOM NUMBERS

(75) Inventor: Juey Chong Ong, Jersey City, NJ (US)

(73) Assignee: John McCann, Point Pleasant, NJ (US)

( * ) Notice: Subject to any disclaimer, the term of this patent is extended or adjusted under 35 U.S.C. 154(b) by 741 days.

(21) Appl. No.: 10/729,790

(22) Filed: Dec. 5, 2003

(65) Prior Publication Data

US 2005/0125470 A1 Jun. 9, 2005

(51) Int. Cl.
*G06F 7/58* (2006.01)

(52) U.S. Cl. .......................................................... 708/250

(58) Field of Classification Search ................. 708/250
See application file for complete search history.

(56) References Cited

U.S. PATENT DOCUMENTS

| | | | | |
|---|---|---|---|---|
| 4,747,600 | A * | 5/1988 | Richardson | 463/19 |
| 4,798,387 | A * | 1/1989 | Richardson | 273/237 |
| 5,627,775 | A * | 5/1997 | Hong et al. | 708/250 |
| 6,760,739 | B2 * | 7/2004 | Takahashi | 708/250 |
| 2004/0072602 | A1 * | 4/2004 | Toyoda | 463/10 |

* cited by examiner

*Primary Examiner*—D. H. Malzahn

(57) ABSTRACT

A method for producing a set of random numbers using a set of digits limited to digitd falling in the range 0 through 9.

3 Claims, 1 Drawing Sheet

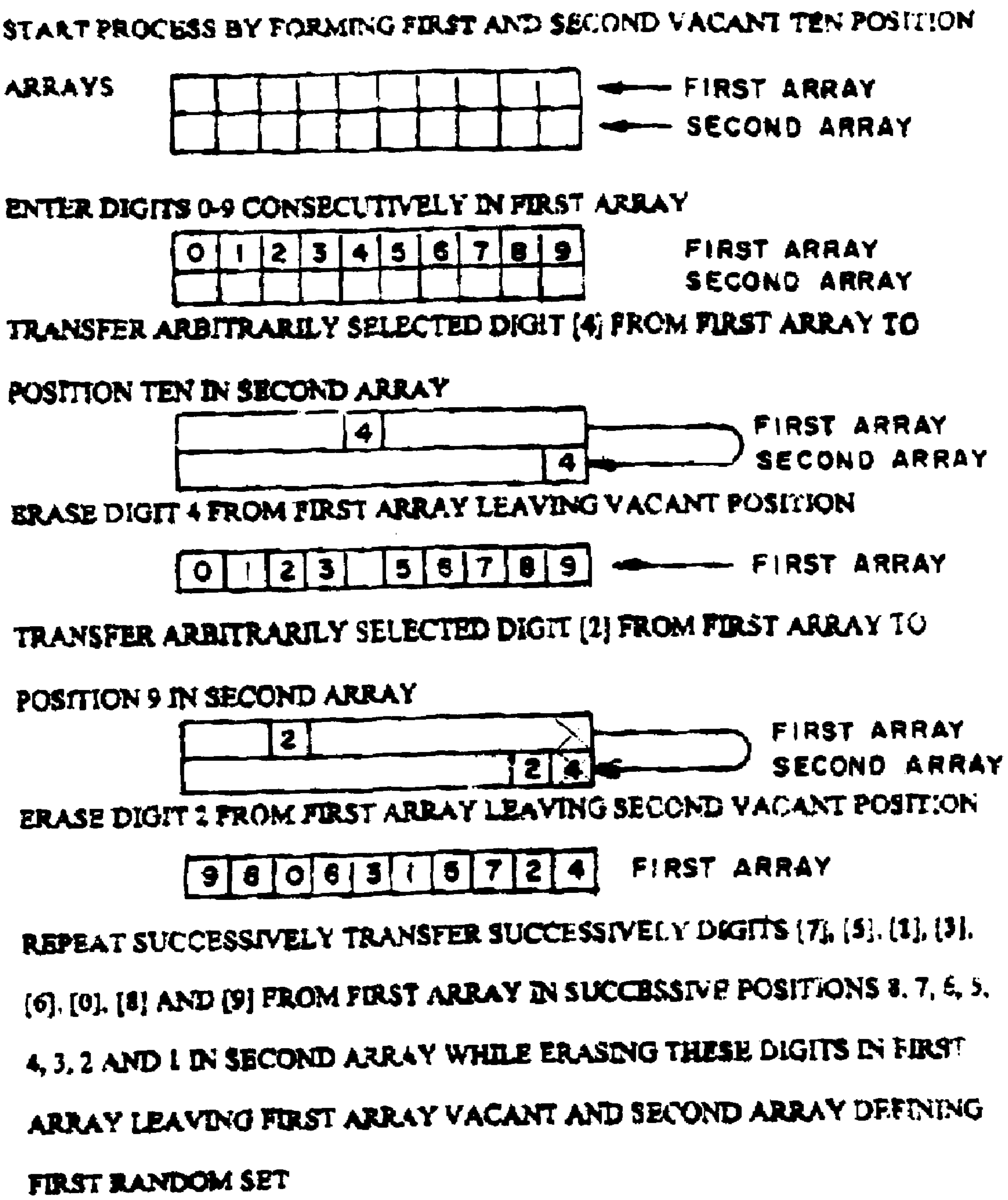
START PROCESS BY FORMING FIRST AND SECOND VACANT TEN POSITION
ARRAYS
FIRST ARRAY
SECOND ARRAY
ENTER DIGITS 0-9 CONSECUTIVELY IN FIRST ARRAY
0 1 2 3 4 5 6 7 8 9
FIRST ARRAY
SECOND ARRAY
TRANSFER ARBITRARILY SELECTED DIGIT [4] FROM FIRST ARRAY TO
POSITION TEN IN SECOND ARRAY
4
4
FIRST ARRAY
SECOND ARRAY
ERASE DIGIT 4 FROM FIRST ARRAY LEAVING VACANT POSITION
0 1 2 3 5 6 7 8 9
FIRST ARRAY
TRANSFER ARBITRARILY SELECTED DIGIT [2] FROM FIRST ARRAY TO
POSITION 9 IN SECOND ARRAY
2
2 4
FIRST ARRAY
SECOND ARRAY
ERASE DIGIT 2 FROM FIRST ARRAY LEAVING SECOND VACANT POSITION
9 8 0 6 3 1 5 7 2 4
FIRST ARRAY
REPEAT SUCCESSIVELY TRANSFER SUCCESSIVELY DIGITS [7], [5], [1], [3],
[6], [0], [8] AND [9] FROM FIRST ARRAY IN SUCCESSIVE POSITIONS 8, 7, 6, 5,
4, 3, 2 AND 1 IN SECOND ARRAY WHILE ERASING THESE DIGITS IN FIRST
ARRAY LEAVING FIRST ARRAY VACANT AND SECOND ARRAY DEFINING
FIRST RANDOM SET

METHODS FOR GENERATING RANDOM NUMBERS

CROSS REFERENCE TO CO-PENDING APPLICATION

The co-pending application bears the Ser. No. 10/729,226 and the filing date of Dec. 05, 2003 and is now abandoned.

BACKGROUND OF THE INVENTION

The above mentioned co-pending application, the contents of which are incorporated by reference herein, discloses a game of chance wherein a limited number of players have gained entry by purchasing rights of use and, after all purchases have been made, one and only one player wins and obtains the benefits of all of the rights of use of all players. The winning player is selected by a random process originated by both a predictable and a non-predictable event. The random process employs random numbers which can be used in this game of chance.

SUMMARY OF THE INVENTION

In accordance with the principles of this invention, first and second number arrays are stored in computer memory. Each array contains ten number receiving spaces numbered consecutively from zero to nine and are originally vacant. Digits zero through nine are then loaded consecutively into corresponding spaces in the first array while the second array remains vacant. Then one digit is selected arbitrarily from the first array and is transferred into the tenth position in the second array. This selected digit is then erased from the first array, leaving its original space blank.

A second digit is arbitrarily selected from the first array and is transferred into the ninth position in the second array. The second selected digit is then erased from the first array, leaving its original space bank.

This process is continued by successively selecting each third, fourth, fifth, sixth seventh and eighth digit from the first array and transferring each selected digit into the corresponding position in the second array while erasing each transferred digit from its position in the first array.

As a result, the first array is vacant and the second array is filled with digits in non consecutive order. The second array then defines a first set of randomly selected numbers for use in the game of chance as described in the aforementioned co-pending application.

BRIEF DESCRIPTION OF THE DRAWINGS

The attached drawing explains the process and illustrates transfer of numbers from the first array to the second array while erasing these numbers from the first array.

DETAILED DESCRIPTION OF PREFERRED EMBODIMENT

As shown in FIG. 1, the process is started by forming first and second vacant ten positions in a computer memory. Digits 0-9 are entered consecutively in the first array leaving the second array blank. The computer transfers an arbitrarily selected digit [4] into the tenth position in the second array. This digit is then erased from the first array leaving its position vacant. The computer then transfers a second arbitrarily selected digit [2] into the ninth position in the second array. This digit is then erased from the first array leaving its position vacant.

The computer then repeats this process using transferring successively digits [7], [5], [1], [3], [6], [0], [8] and [9] into corresponding positions in the second array while erasing these digits in the first array leaving the first array vacant and the second array defining the first random set 9 8 0 6 3 1 5 7 2 4.

While the invention has been described with particular reference to the detailed description and drawing, the protection solicited is to be limited only by the terms of the claims that follow,

What is claimed is:

1. A method for generating random numbers comprising:

forming first and second number storage arrays, each array having ten number storage spaces, both arrays being vacant;

loading digits 0 through 9 into corresponding spaces in the first array, leaving the second array vacant;

transferring a first arbitrarily selected digit from the group of digits 0 through nine into the tenth position in the second array;

erasing this first digit from its position in the first array;

continuing the transfer process for transferring second, third, fourth, fifth, sixth, seventh, eighth, ninth, and tenth arbitrarily selected digits successively into the ninth, eighth, seventh, sixth, fifth, fourth, third, second and first positions in the second array while erasing these digit from their positions in the first array whereby these digits are all loaded in the second array and the first array is vacant.

2. The method of claim 1 wherein the digits loaded into the second array define a first random set.

3. The method of claim 2 which is repeated to produce a plurality of additional random sets.

* * * * *